No. 718,231. PATENTED JAN. 13, 1903.
W. E. WHITBREAD.
MOTOR VEHICLE.
APPLICATION FILED JUNE 7, 1902.
NO MODEL. 3 SHEETS—SHEET 1.
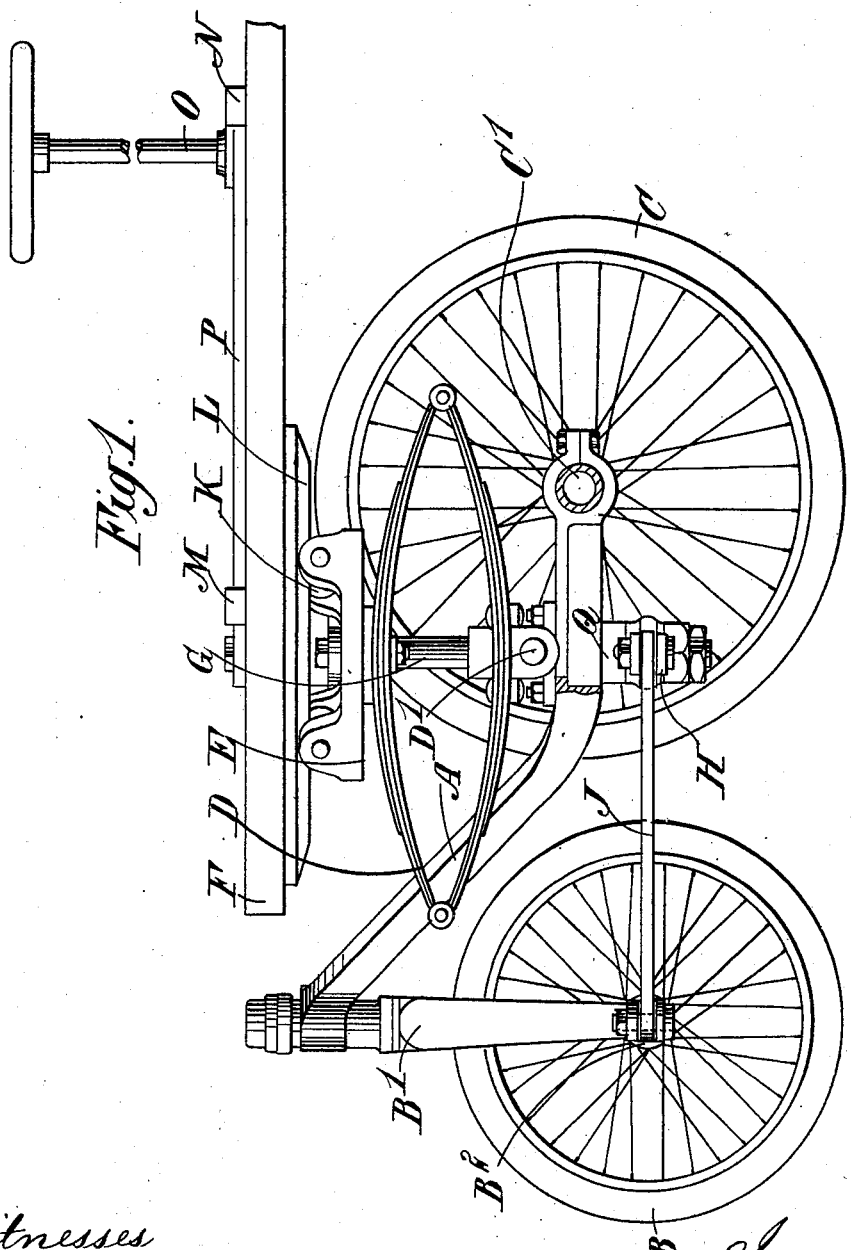

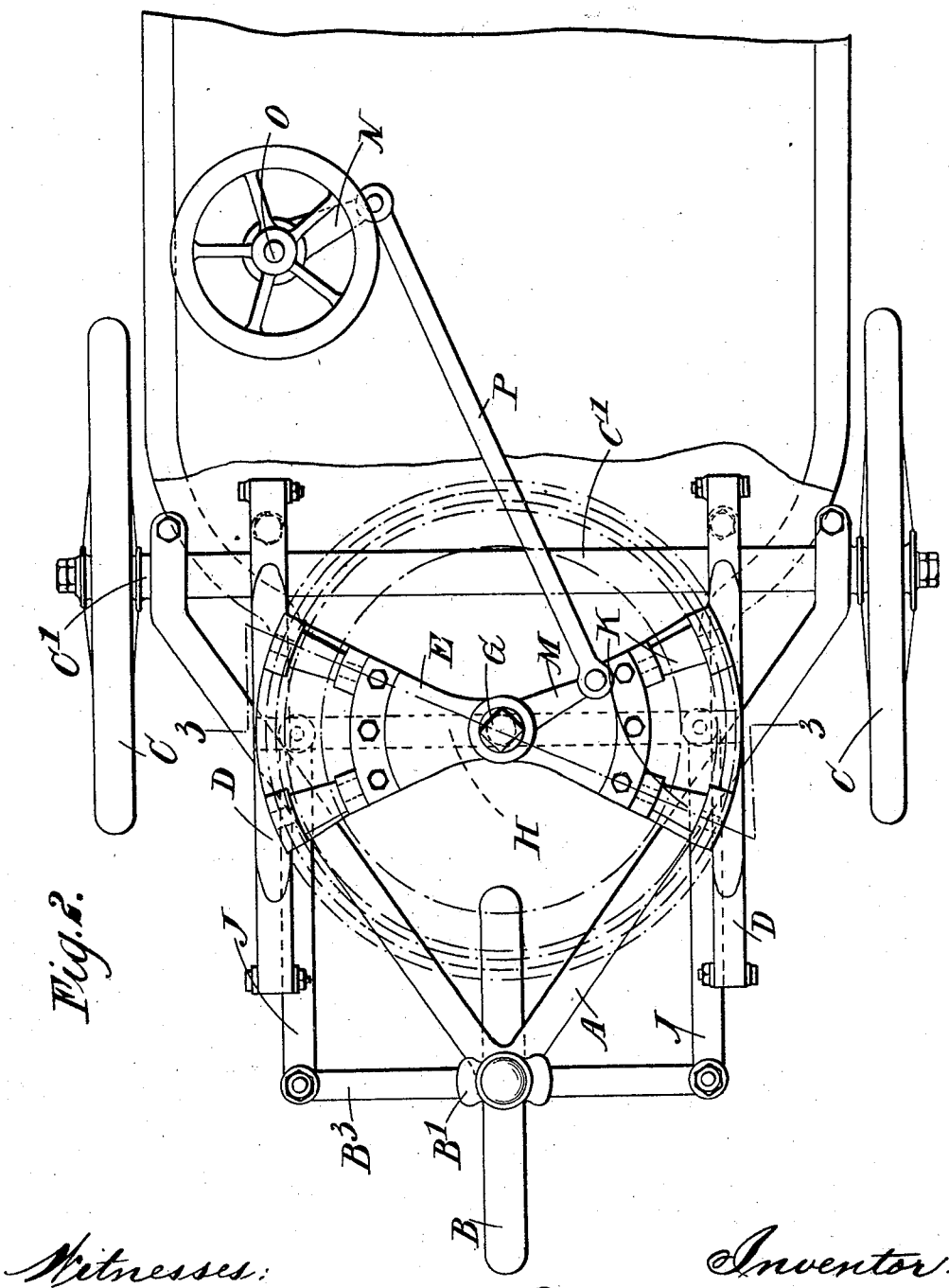

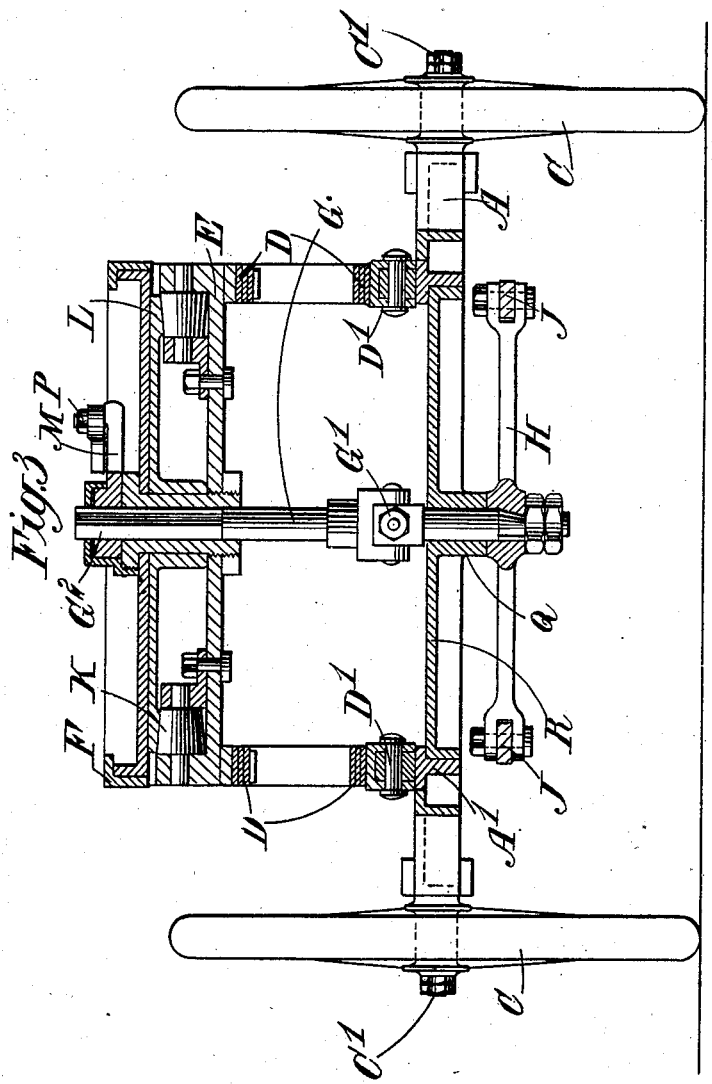

UNITED STATES PATENT OFFICE.

WILLIAM E. WHITBREAD, OF GODALMING, ENGLAND, ASSIGNOR OF ONE-HALF TO ROBERT CORKLING, OF LONDON, N. W., ENGLAND.

MOTOR-VEHICLE.

SPECIFICATION forming part of Letters Patent No. 718,231, dated January 13, 1903.

Application filed June 7, 1902. Serial No. 110,650. (No model.)

*To all whom it may concern:*

Be it known that I, WILLIAM EDWARD WHITBREAD, a subject of the King of England, residing at Godalming, Surrey, England, have invented certain new and useful Improvements in or Relating to Motor or other Road Vehicles, of which the following is a specification.

The present invention relates to vehicles, the object being to minimize or prevent the oscillations in running over a rough or uneven road; to minimize or prevent swaying and the consequent tendency to overturn, especially on descents; to reduce the tendency to upset in turning quickly, and to make the course of the vehicle more subject to control.

The fore-carriage, to which the invention particularly relates, is specially designed for use with motor-vehicles, but can also be adapted for use with horse-drawn or other traction vehicles.

In the accompanying drawings, which represent a fore-carriage constructed according to one method of carrying out this invention, Figure 1 is a side elevation of the fore-carriage, Fig. 2 is a plan, and Fig. 3 is a transverse section on the lines 3 3 of Figs. 1 and 2.

Referring to the drawings, a rigid frame A is provided, carrying a pivoted leading wheel B and two following wheels C. Springs D of suitable type are attached by pivots D' or the like on supports A' on the frame A at points in advance of the axle C' of the following wheels C and bearing a support E for the fore part of the vehicle F, the latter, the support, and the frame being pivotally connected.

According to this invention the rod G, which forms the pivotal connection between the fore-carriage A E and the vehicle-body F, serves also as a steering-spindle for the leading wheel B, connecting the upper with the lower steering-gear, and for this and the preceding purposes the rod G is provided with a universal joint G', situated at a point approximately midway between the centers of oscillation D' of the springs D. This rod G carries below the joint G' a yoke H, which is connected by one or more links J or the like with the fork B' of the leading wheel B or the extended ends of the axle $B^2$, quadrants, pinions, levers, and sliding blocks or other mechanical appliances may be used. The upper end of the rod above the universal joint is provided with a short arm M, which is operated from a lever N on the steering-pillar O by a connecting-rod P. Any other means of connection to steering-gear preferably of known type may be employed. The upper lever M or whatever appliance is used to convey motion to the rod G may be placed in any suitable position on the rod to suit the special requirements of different vehicles.

The springs D, which are attached or affixed to the fore-carriage, carry a support E, which bears the fore part of the vehicle F on roller-bearings K or the like. The support conveniently consists of a transverse plate or of a longitudinal plate or a system of diagonal bars disposed beneath the fore part of the vehicle F and provided with roller, cone, or ball bearings or the like working upon the beveled edge or surface of a ring or disk L, attached to or forming part of the vehicle-body F, the object of the bearing being to allow the fore-carriage to rotate about its pivot in order that the following wheels C may be freely brought into the correct position on turning.

The rod G, which acts as a pivot for the fore-carriage and as a steering-spindle, passes through the center of the support E, and the end above the universal joint can move freely in an upward and downward direction with the expansion and contraction of the springs D on the fore-carriage, the lower end having only a rotary motion. This movement may be allowed for by forming the spindle telescopic, as at $G^2$, or otherwise arranging the steering-gear.

In the case of a horse-drawn vehicle the steering-gear is dispensed with and the shafts, poles, or couplings are connected directly to the fork of the front wheel. The fore-carriage is, however, chiefly intended for use with motor-vehicles, and in this case lugs $B^3$ are provided on the fork of the leading wheel B or the axis $B^2$ is extended and links J or similar members are employed to connect the lugs or the extended ends with the yoke H below the universal joint on the steering-spindle G.

The steering-gear may be placed beneath the bottom of the vehicle, or the steering-spindle G may pass through a hole in the floor or frame of the vehicle F, and the gear may be arranged above the floor. A bearing Q for the lower end of the steering-spindle is formed in a transverse bar R, forming part of the fore-carriage.

When the invention is applied to a motor-vehicle, the motor may be arranged on the body of the vehicle or on the fore-carriage itself. In the latter case connections for controlling the motor may be arranged so as to allow of the relative movement of the fore-carriage and vehicle-body.

The object of placing the springs D in advance of the axle C' of the following wheels and capable of oscillation to and fro on pivotal bearings D' in line with the universal joint G' is to allow the fore-carriage to yield to the inequalities of the road without imparting corresponding motion to the body of the vehicle, and, further, to permit any one of the three wheels of the fore-carriage to move slightly in an upward or downward direction in order to pass over the uneven portions of the road without affecting the body of the vehicle itself or disturbing the steering.

What I claim as my invention, and desire to secure by Letters Patent, is—

1. In a vehicle the combination of a frame carrying a leading wheel and two following wheels, a resilient support on the frame for the fore part of the vehicle, a rod forming a pivotal connection between the frame the support and the vehicle and serving also as a steering-spindle and operative connections between the spindle and the front wheel.

2. In a vehicle the combination of a frame carrying a leading wheel and two following wheels a resilient support on the frame for the fore part of the vehicle, a rod forming a pivotal connection between the frame the support and the vehicle and serving also as a steering-spindle, a flexible joint in the rod and operative connections between the steering-spindle and the front wheel.

3. In a vehicle the combination of a frame carrying a leading wheel and two following wheels, a resilient support on the frame for the fore part of the vehicle disposed in advance of the axle of the following wheels a rod forming a pivotal connection between the frame, the support and the vehicle and serving also as a steering-spindle, a flexible joint in the rod and operative connections between the steering-rod and the front wheel.

4. In a vehicle the combination of a frame carrying a leading wheel and two following wheels, a resilient support on the frame for the fore part of the vehicle disposed in advance of the axle of the following wheels, a rod forming a pivotal connection between the frame the support and the vehicle and serving also as a steering-spindle a flexible joint in the rod, means for allowing the steering-rod to rise and fall and operative connections between the steering-rod and the front wheel.

5. In a vehicle the combination of a frame carrying a leading wheel and two following wheels, a resilient support on the frame for the fore part of the vehicle disposed in advance of the axle of the following wheels, a rod forming a pivotal connection between the frame, the support and the vehicle and serving also as a steering-spindle, a bearing in the frame for the rod, a flexible joint in the rod, means for allowing the steering-rod to rise and fall and operative connections between the steering-rod and the front wheel.

6. In a vehicle the combination of a frame carrying a leading wheel and two following wheels, a resilient support on the frame for the fore part of the vehicle disposed in advance of the axle of the following wheels, a rod forming a pivotal connection between the frame the support and the vehicle and serving also as a steering-spindle, a bearing in the frame for the rod, a flexible joint in the rod between the centers of oscillation of the resilient support, means for allowing the steering-rod to rise and fall and operative connections between the steering-rod and the front wheel.

7. In a vehicle the combination of a frame carrying a leading wheel and two following wheels, a resilient support on the frame for the fore part of the vehicle disposed in advance of the axle of the following wheels, frictionless bearings between the support and the vehicle, a rod forming a pivotal connection between the frame the support and the vehicle and serving also as a steering-spindle, a bearing in the frame for the rod, a flexible joint in the rod between the centers of oscillation of the resilient support, means for allowing the steering-rod to rise and fall and operative connections between the steering-rod and the front wheel.

8. In a vehicle the combination of a frame, a leading wheel pivoted thereto, two following wheels journaled in the frame, springs disposed on the frame in advance of the axle of the following wheels, a support for the fore part of the vehicle carried on the springs, a rod forming a pivotal connection between the frame the support and the vehicle and serving also as a steering-spindle, a universal joint in the rod, a yoke at the bottom of the rod and links connecting the yoke with the axle of the leading wheel.

9. In a vehicle the combination of a frame, a leading wheel pivoted thereto, two following wheels journaled in the frame, springs disposed on the frame in advance of the axle of the following wheels, a support for the fore part of the vehicle carried on the springs, a rod forming a pivotal connection between the frame the support and the vehicle and serving also as a steering-spindle, a bearing in the frame for the rod, a universal joint in the rod a yoke at the bottom of the rod and links connecting the yoke with the axle of the leading wheel.

10. In a vehicle the combination of a frame, a leading wheel pivoted thereto, two following wheels journaled in the frame, springs disposed on the frame in advance of the axle of the following wheels, a support for the fore part of the vehicle carried on the springs, a rod forming a pivotal connection between the frame the support and the vehicle and serving also as a steering-spindle, a bearing in the frame for the rod, a universal joint in the rod, a yoke at the bottom of the rod, links connecting the rod with the axle of the leading wheel and a telescopic joint in the steering-rod.

11. In a vehicle the combination with a frame, a leading wheel pivoted thereto, two following wheels journaled in the frame, springs disposed on the frame in advance of the axle of the following wheels, a support for the fore part of the vehicle carried on the springs, a rod forming a pivotal connection between the frame the support and the vehicle and serving also as a steering-spindle, a bearing in the frame for the rod, a universal joint in the rod between the centers of oscillation of the springs, a yoke at the bottom of the rod, links connecting the yoke with the axle of the leading wheel and a telescopic joint in the steering-rod.

12. In a vehicle the combination of a frame, a leading wheel pivoted thereto, two following wheels journaled in the frame, springs disposed on the frame in advance of the axle of the following wheels, a support for the fore part of the vehicle carried on the springs, roller-bearings between the support and the vehicle-body, a rod forming a pivotal connection between the frame the support and the vehicle and serving also as a steering-spindle, a bearing in the frame for the rod, a universal joint in the rod between the centers of oscillation of the springs, a yoke at the bottom of the rod, links connecting the yoke with the axle of the leading wheel and a telescopic joint in the steering-rod.

13. In a vehicle the combination of a frame, a leading wheel pivoted thereto, two following wheels journaled in the frame, springs disposed on the frame in advance of the axle of the following wheels, pivotal connections between the springs and the frame, a support for the fore part of the vehicle carried on the springs, roller-bearings between the support and the vehicle-body, a rod forming a pivotal connection between the frame the support and the vehicle and serving also as a steering-spindle, a bearing in the frame for the rod, a universal joint in the rod between the centers of oscillation of the springs, a yoke at the bottom of the rod, links connecting the yoke with the axle of the leading wheel and a telescopic joint in the steering-rod.

14. In a vehicle the combination of a frame a leading wheel pivoted thereto, two following wheels journaled in the frame, springs disposed on the frame in advance of the axle of the following wheels, pivotal connections between the springs and the frame, a support for the fore part of the vehicle carried on the springs, roller-bearings between the support and the vehicle-body, a rod forming a pivotal connection between the frame the support and the vehicle and serving also as a steering-spindle, a bearing in the frame for the rod, a universal joint in the rod between the centers of oscillation of the springs, a yoke on the bottom of the rod, links connecting the yoke with the axle of the leading wheel a telescopic joint in the steering-rod and steering-gear to operate the steering-rod.

In testimony whereof I have signed my name to this specification in the presence of two subscribing witnesses.

W. E. WHITBREAD.

Witnesses:
WILLIAM H. BALLANTYNE,
HARRY B. BRIDGE.